United States Patent
Counts et al.

(10) Patent No.: US 9,836,738 B2
(45) Date of Patent: Dec. 5, 2017

(54) INBOUND INTEGRATED PRODUCTION MESSAGES TRANSACTION FILE SPLITTER

(71) Applicant: MasterCard International Incorporated, Purchase, NY (US)

(72) Inventors: Archie G. Counts, O'Fallon, MO (US); Kevin Lyons, O'Fallon, MO (US); Janice Mehanovic, Maplewood, MO (US); Ken Pirtle, Saint Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/038,519

(22) Filed: Sep. 26, 2013

(65) Prior Publication Data

US 2015/0088730 A1    Mar. 26, 2015

(51) Int. Cl.
- *G06Q 20/22* (2012.01)
- *G06Q 20/38* (2012.01)
- *G06Q 20/34* (2012.01)

(52) U.S. Cl.
CPC .................... *G06Q 20/34* (2013.01)

(58) Field of Classification Search
None
See application file for complete search history.

(56) References Cited

U.S. PATENT DOCUMENTS

| | | | |
|---|---|---|---|
| 5,983,215 A | 11/1999 | Ross et al. | 707/2 |
| 7,818,286 B2 | 10/2010 | Chu et al. | 707/102 |
| 7,921,138 B2 | 4/2011 | Thompson et al. | 707/802 |
| 8,364,585 B1 | 1/2013 | Edmonds et al. | 705/39 |
| 8,412,752 B2 | 4/2013 | Dodge | 707/824 |
| 8,452,704 B2 | 5/2013 | Barbara et al. | 705/40 |
| 2003/0144942 A1* | 7/2003 | Sobek | 705/36 |
| 2003/0177135 A1 | 9/2003 | Lechowicz et al. | 707/1 |
| 2007/0125838 A1 | 6/2007 | Law et al. | 235/380 |
| 2008/0040249 A1* | 2/2008 | Re et al. | 705/35 |
| 2012/0150728 A1 | 6/2012 | Isaacson et al. | 705/14.34 |
| 2012/0311684 A1* | 12/2012 | Paulsen et al. | 726/6 |
| 2013/0144780 A1* | 6/2013 | Edmonds | G06Q 20/38 705/39 |
| 2013/0297490 A1* | 11/2013 | McWhinney et al. | 705/39 |

FOREIGN PATENT DOCUMENTS

| | | |
|---|---|---|
| WO | PCT/US98/08339 | 11/1998 |
| WO | PCT/US14/057376 | 9/2014 |

OTHER PUBLICATIONS

International Search Report and Written Opinion dated Jan. 2, 2015 for International Patent Application No. PCT/US2014/057376, which was filed Sep. 25, 2014 (Inventor—Counts // Applicant—MasterCard Int'l Inc.) (8 pages).

* cited by examiner

*Primary Examiner* — Robert R Niquette
*Assistant Examiner* — Joseph W King
(74) *Attorney, Agent, or Firm* — Ballard Spahr LLP

(57) ABSTRACT

A payment card transaction clearing system includes a payment card network. A file distribution system coupled to the payment card network includes a split processor configured to receive a batch of payment card transaction records from the payment card network, and split the batch of payment card transactions into one or more split files according to one or more processing agreements. A split monitor processor is configured to send the one or more split files to the payment card network.

11 Claims, 5 Drawing Sheets

| BATCH FILE ID (503) | SPLIT FILE ID (505) | SENT (Y/N) (507) |
|---|---|---|
| AAA | | Y |
| | AAA_GLOBAL | Y |
| | AAA_LOCAL_A | Y |
| | AAA_LOCAL_B | Y |
| BBB | | N |
| | BBB_GLOBAL | N |
| | BBB_LOCAL_B | N |
| CCC | | N |
| | CCC_LOCAL_A | N |
| | CCC_LOCAL_B | N |
| ... | ... | ... |

501

| GEOGRAPHIC RULE — 203 | — 201 | CURRENCY — 204 | CMS — 205 |
|---|---|---|---|
| MERCHANT AND ACQUIRER AND ISSUER = COUNTRY A | | CURRENCY A | LOCAL_A |
| MERCHANT AND ACQUIRER AND ISSUER = COUNTRY B | | CURRENCY B | LOCAL_B |
| ... | | ... | ... |
| ELSE | | ELSE | GLOBAL |

FIG. 2

| BATCH FILE ID — 303 | SENT (Y/N) — 305 |
|---|---|
| AAA | Y |
| BBB | N |
| CCC | N |
| ... | ... |

| BATCH FILE ID — 403 | PROCESSING (Y/N) — 405 |
|---|---|
| AAA | Y |
| BBB | N |
| CCC | N |
| ... | ... |

| BATCH FILE ID — 503 | SPLIT FILE ID — 505 | SENT (Y/N) — 507 |
|---|---|---|
| AAA | | Y |
| | AAA_GLOBAL | Y |
| | AAA_LOCAL_A | Y |
| | AAA_LOCAL_B | Y |
| BBB | | N |
| | BBB_GLOBAL | N |
| | BBB_LOCAL_B | N |
| CCC | | N |
| | CCC_LOCAL_A | N |
| | CCC_LOCAL_B | N |
| ... | ... | ... |

INBOUND INTEGRATED PRODUCTION MESSAGES TRANSACTION FILE SPLITTER

BACKGROUND

Field of the Disclosure

The present disclosure relates generally to the field of payment card processing, and more particularly to methods, systems and computer program products to split payment card transaction batches to clear according to processing agreements.

Description of the Related Art

Several processes are involved in commerce using payment cards. When a customer presents a payment card to a merchant, the merchant invokes an authorization process through the merchant's bank, the payment card network to the bank that issued the payment card, in which the issuing bank determines whether or not there are sufficient funds in the account associated with the payment card to cover the amount of the transaction. If there are sufficient funds, the issuing bank authorizes the transaction and the merchant delivers the subject of the transaction to the customer.

Periodically, the merchant or acquiring bank sends a batch of transactions for a particular brand of payment card to the payment card network for clearing and settlement. The payment card network sends the batch to a global clearing management system, which forwards the transactions of the batch to the appropriate issuing bank. The issuing bank debits the transaction amount from the account associated with the payment card and transfers the transaction amount, less a fee, to the credit card network. The credit card network transfers the amount it receives, less its fee, to the acquiring bank. The acquiring bank deposits into the merchant's account the amount it receives, less its fee.

Some countries and regions, wishing to have tighter control of their currency and commerce within their borders, have imposed processing agreements on payment card processors, which regulate the clearing and settlement processes. For example, Russia requires that all payment card transactions in which the merchant, the acquiring bank and the issuing bank are all located in Russia must be cleared through a dedicated Russian clearing management system separate from the global clearing management system.

SUMMARY

Embodiments include methods, systems, and computer-readable media that enable clearing of payment card transactions according to processing agreements.

In one aspect, a method of clearing payment card transactions includes receiving a batch of payment card transaction records at a network interface. The method uses a processor to split the batch of payment card transactions into one or more split files according to one or more processing agreements. The method distributes, via the network interface, the one or more split files to one or more clearing management systems according to the one or more processing agreements.

In another aspect, a payment card transaction clearing system includes a payment card network. A file distribution system is coupled to the payment card network. The file distribution system includes a split processor configured to receive a batch of payment card transaction records from the payment card network and split the batch of payment card transactions into one or more split files according to one or more processing agreements. A split monitor processor is configured to send the one or more split files to the payment card network.

In another aspect, a non-transitory computer-readable storage medium is encoded with data and instructions, which when executed by a computing device the instructions causing the computing device to receive a batch of payment card transaction records at a network interface. The instructions split the batch of payment card transactions into one or more split files according to one or more processing agreements, and distribute the one or more split files to one or more clearing management systems according to the one or more processing agreements.

BRIEF DESCRIPTION OF THE DRAWINGS

The disclosure will best be understood by reference to the following detailed description of an illustrative embodiment when read in conjunction with the accompanying drawings, where:

FIG. 2 is a pictorial representation of an embodiment of a processing agreement splitting rule table;

FIG. 3 is a pictorial representation of an embodiment of a table of batch transaction file send status;

FIG. 4 is a pictorial representation of an embodiment of a table of batch transaction file split processing status;

FIG. 5 is a pictorial representation of an embodiment of a table of split transaction file send status;

DETAILED DESCRIPTION

Figure 1:
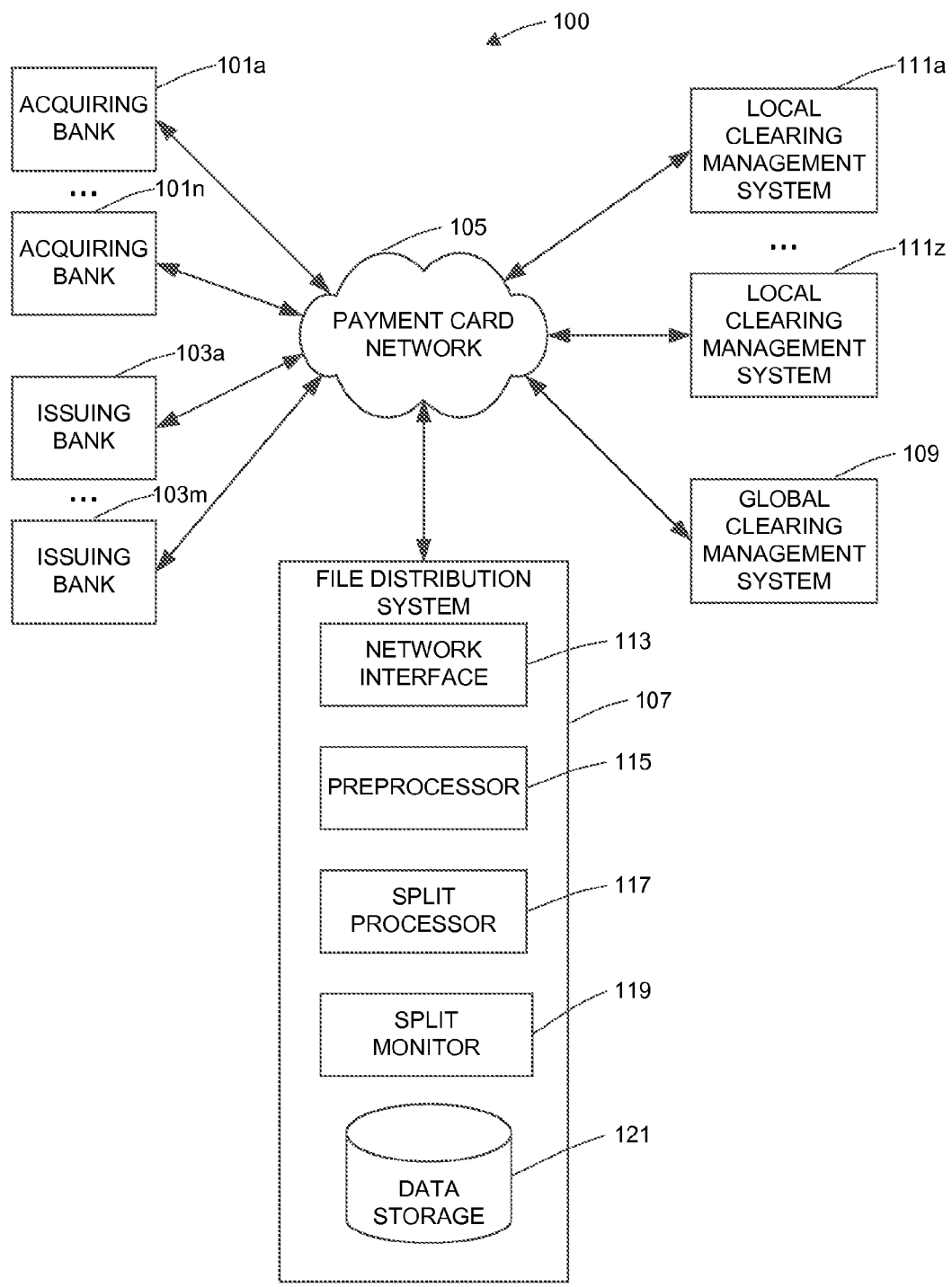
FIG. 1 is a block diagram of an embodiment of a payment card clearing system.

Referring now to the drawings, and first to FIG. 1, an embodiment of a payment card clearing system is designated generally by the numeral 100. As used herein the term payment card refers to credit cards, debit cards, gift cards, stored value cards, and the like. System 100 is configured to clear payment card transactions between a plurality of acquiring financial institutions 101*a*-101*n* and a plurality of issuing financial institutions 103*a*-103*m*, which are connected to a payment card network 105. Acquiring financial institutions, also known as merchant financial institutions, receive payment card transactions from merchants for purchases made by payment card holders. Issuing financial institutions issue payment cards to the credit card holders.

System 100 includes a file distribution system 107, a global clearing management system 109, and a plurality of local clearing management systems 111*a*-111*z*, each connected to payment card network 105. As will be described in detail hereinafter, file distribution system 107 receives payment card transaction batches from acquiring financial institutions via payment card network 105. File distribution system 107 splits the transaction batches into split files. As used herein, split file refers to a file that has been split from a batch according to a processing agreement. Processing agreements are governmental, or other, rules that require special clearing processes for transactions meeting specified criteria. File distribution system 107 distributes the split files to appropriate local clearing management systems 111a-111z or global clearing management system 109. Local clearing management systems 111a-111z and global clearing management system 109 clear and settle payment card transactions between issuing financial institutions 103a-103m and acquiring financial institutions 101a-101n. The process of clearing and settling payment card transactions involves transferring funds from an account at the issuing financial institution to an account at the acquiring financial institution, with the issuing financial institution, payment card network and acquiring financial institution each receiving a fee.

File distribution system 107 includes a network interface 113, which includes a combination of hardware, such as network cards or adapters, and software, such as protocol stacks, coupled to payment card 105. File distribution system 107 also includes a preprocessor 115, a split processor 117, and a split monitor 119. Although FIG. 1 illustrates file distribution system 107 as including a single preprocessor 115, split processor 117, and split monitor 119, it will be recognized that preprocessor 115, split processor 117, and split monitor 119 may be implemented in multiple separate physical machines, as in clusters of machines, and/or as multiple instances of virtual machines running on a single physical system or over a cluster of machines.

Preprocessor 115 determines, based upon identification information in a batch header or the like, whether or not a batch of payment card transactions needs undergo split processing by split processor 117. As will be described in detail hereinafter, preprocessor 115 forwards batches not identified as requiring split processing directly to global clearing management system 109.

Preprocessor 115 forwards batch files identified by the acquiring financial institution as requiring split processing to split processor 117. As will be described in detail hereinafter, split processor 117 applies rules according to processing agreements to whether a transaction of the batch may be cleared by global clearing management system 109, or must be cleared by a particular local clearing management system.

Split processor 117 splits each batch into one or more split files. Split monitor 119 distributes the split files to the appropriate local clearing management system 111a-111z or global clearing management system 109. File distribution system 107 includes data storage 121, which stores data, files and tables used by file distribution system 107.

Referring to FIG. 2, there is illustrated a representation of a processing agreement splitting rules table 201 according to embodiments of the present disclosure. File distribution system 107 maintains splitting rules table 201 and, as will be described in detail hereinafter, split processor 117 refers to splitting rules table 201 in determining where transactions should be cleared. Splitting rules table 201 may be updated periodically, as at the start of each business day, to reflect new or amended processing agreements. Keeping the splitting rules in splitting rules table 201 allows for flexibility and scalability as processing rules change.

Splitting rules table 201 includes a geographic, or political boundaries, rules column 203, a currency rules column 204, and a clearing management system (CMS) column 205. The currency rule may be turned ON or OFF according to the applicable processing agreement. As shown in FIG. 2, if the merchant, acquirer and issuer for all belong to Processing Agreement A and currency rule is ON, the transaction currency must match the Processing Agreement to process in the local clearing management system for Processing Agreement A. Similarly, if the currency rule is ON and the merchant, acquire and issuer for a transaction belong to Processing Agreement B, the transaction currency must match Processing Agreement for the transaction to clear by the local clearing management system for country B. If the currency rule is OFF, only the splitting rules are applied. In the default case, where no rule in splitting rule table 201 applies to a transaction, the transaction is cleared by global clearing management system 109. It should be recognized that a processing agreement may cover more or less than a single country. For example, a processing agreement may cover a region comprising multiple countries or a political division with a country. In any event, the splitting rules define how transactions are to be split according to processing agreements.

FIG. 3 illustrates a representation of an embodiment of a batch file send status table 301. Batch file send status table 301 includes a batch file ID column 303 and a sent column 305. Each batch file has a unique ID, which is included in column 303. When file distribution system 107 receives a batch file, the system enters the ID for the batch in column 303. Column 305 indicates whether not a particular batch file has been processed and the resulting split files have been sent to a clearing management system.

FIG. 4 illustrates a representation of an embodiment of a batch file processing status table 401. Batch file processing status table 401 includes a batch file ID column 403, which is populated when a batch file is received, and a processing column 405. Column 405 indicates whether not a particular batch file is currently being processed by split processor 117 or split monitor 119. As will be described in detail hereinafter, split processor 117 and split monitor 119 use status tables 301 and 401 to keep track of the batches. In cases where file distribution system 107 includes multiple simultaneously executing instances of split processor 117 and/or split monitor 119, status tables 301 and 401 prevent the same batch being processed on more than one machine.

FIG. 5 illustrates a representation of an embodiment of a split file send status table 501. Split file send status table 501 is a child table of batch file send status table 301. Split file send status table 501 includes a batch file ID column 503, a split file ID column 505, and a sent column 507. As will be described in detail hereinafter, split processor 117 populates columns 503 and 505 when it performs split processing. Split monitor 119 updates column 507 when it sends to the clearing management systems all of the split files related to a particular batch file.

Figure 6:
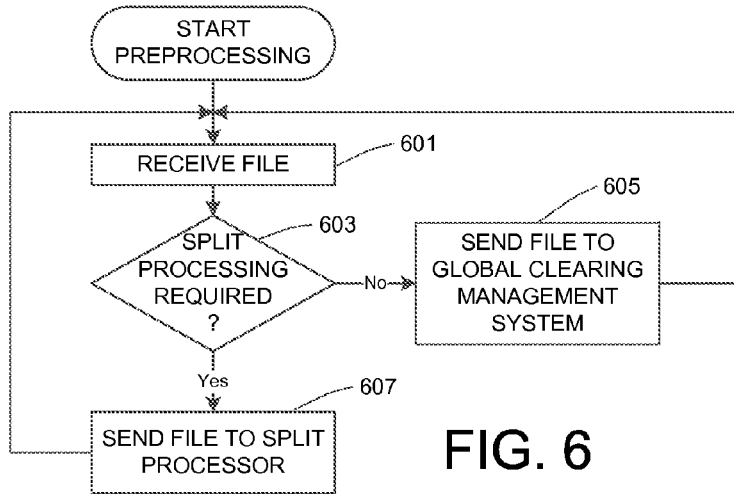
FIG. 6 is a flowchart of an embodiment of preprocessor processing.

FIG. 6 is a flowchart of an embodiment of preprocessing according to the present disclosure. Preprocessor 115 receives a batch file, as indicated at block 601. According to embodiments of the present disclosure, acquiring financial institutions in countries subject to a processing agreement include in the headers of batch files that they submit to payment card network 105 a string that identifies the batch as requiring split processing. The preprocessor examines the header and determines, at decision block 603, whether or not the batch file is identified as requiring split processing. If the batch is not so identified, the preprocessor sends the batch file to global clearing management system 109. If the batch is identified as requiring split processing, the preprocessor sends the file to split processor, as indicated at block 607.

Figure 7:
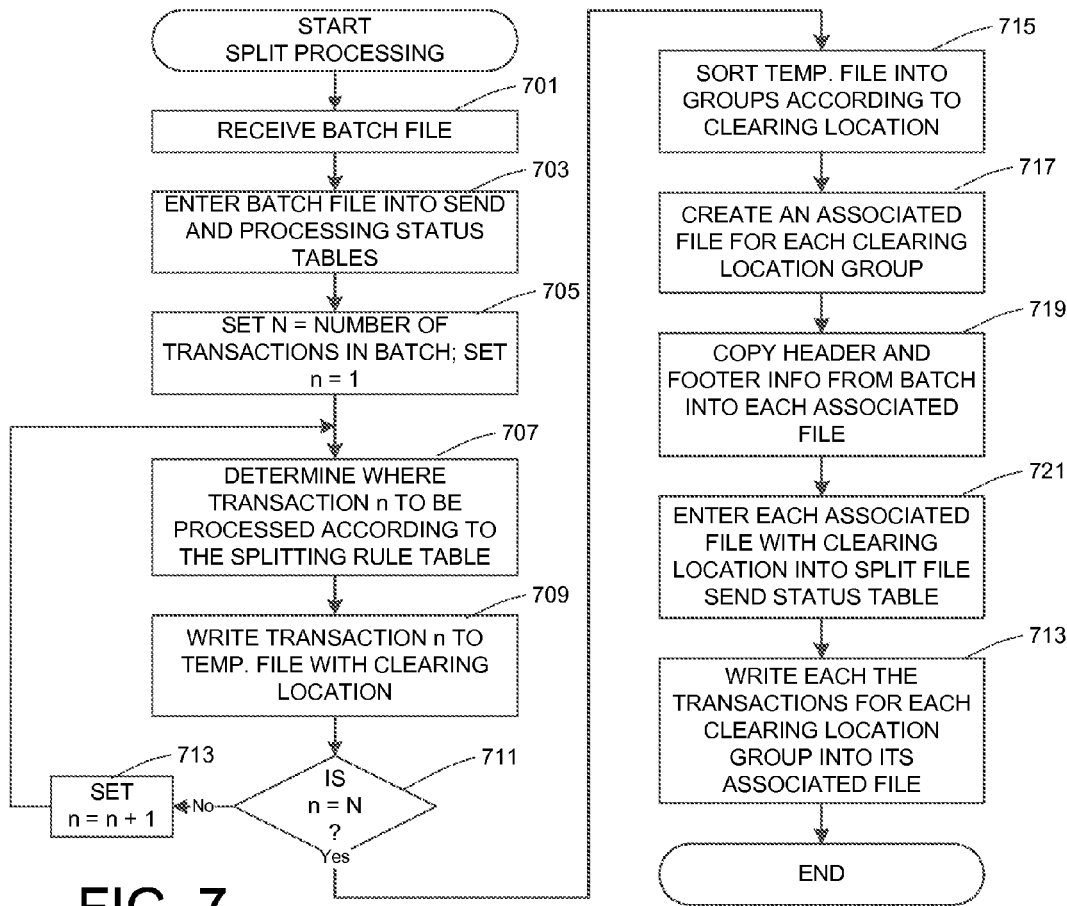
FIG. 7 is a flowchart of an embodiment of split processor processing.

FIG. 7 is a flowchart of an embodiment of split processing according to the present disclosure. Split processor 117 receives a batch file, at block 701. The split processor enters the batch file ID into send and processing status tables 301 and 401, respectively, at block 703. The split processor set a constant N equal to the number of transactions in the batch, and sets a constant n equal to 1, at block 705. Then, the split processor determines where transaction n is to be processing according to processing agreement split rule table 201, as indicated at block 707, writes transaction n to a temporary file with its clearing location, as indicated at block 709. The split processor then tests, at decision block 711, if n is equal to N. If n is not equal to N, the split processor increments n, at block 713, and processing returns to block 707.

The split processor loops through blocks 707-713 until all n is equal to N, as determined at decision block 711. Then the split processor sorts the temporary file into groups according to clearing management system location, at block 715, and creates an associated file for each clearing management location group, as indicated at block 717. The split processor then copies the header and footer information from the batch file into each associated split file, as indicated at block 719, enters each associated split file with its clearing management system location into split file send status table 501, as indicated at block 721, and writes each transaction for each clearing management system group into it associated file, as indicated at block 723. Split files may be stored in data storage 121 to await processing by split monitor 119.

Figure 8:
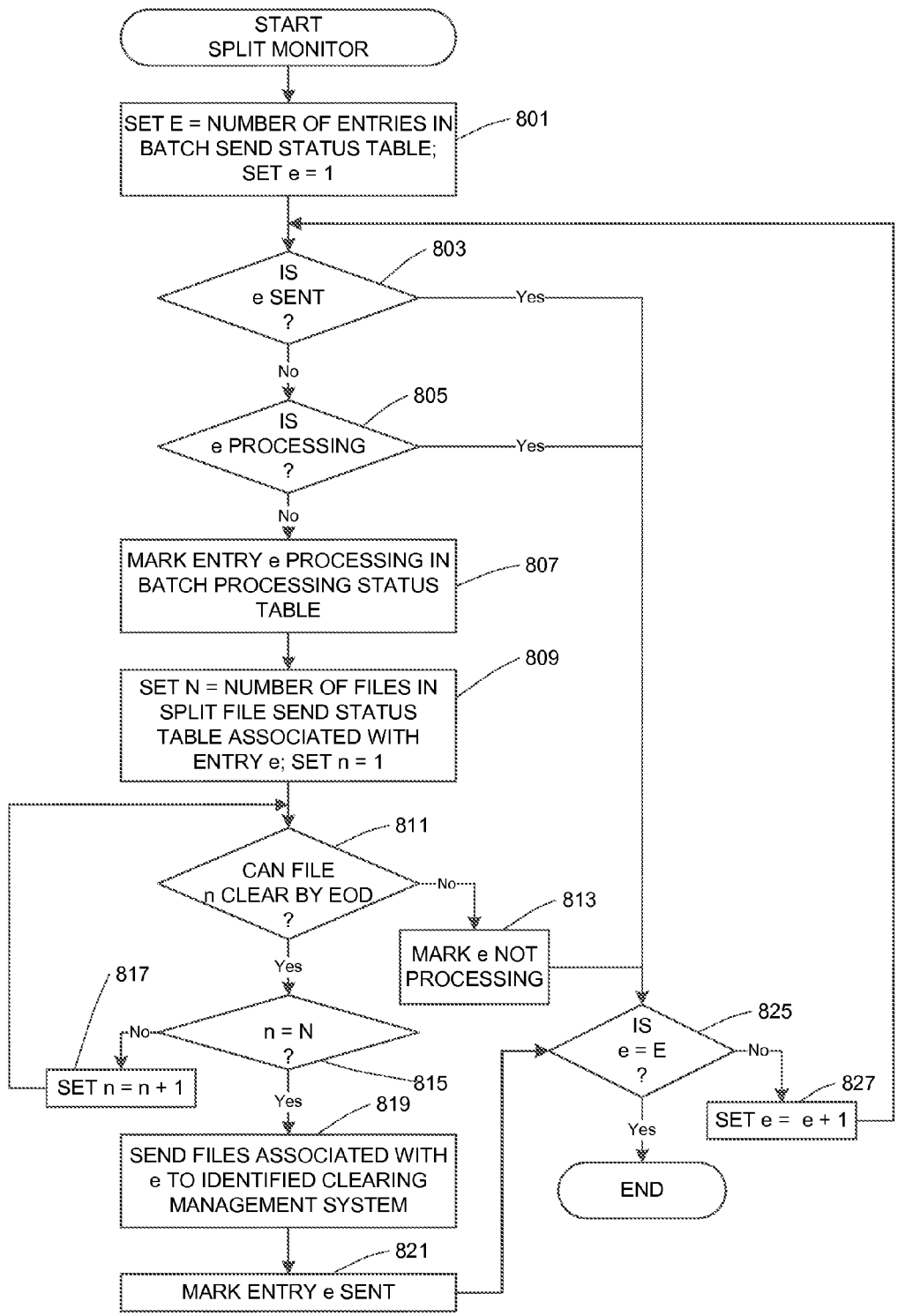
FIG. 8 is a flowchart of an embodiment of split monitor processing.

FIG. 8 is a flowchart of an embodiment of split monitor processing according to the present disclosure. Split monitor 119 works with reference to batch file send status table 301. The split monitor sets a constant E equal to the number of batch file entries in table 301, and sets a constant e equal to 1, at block 801. Then, the split monitor determines, at decision block 803, if batch file e is marked sent in table 301. If batch file e is marked sent, split monitor determines, at decision block 825, if e is equal to E. If e is not equal to E, the split monitor increments e, at block 827, and returns to decision block 803.

Returning to decision block 803, if batch e is not marked sent in table 301, the split monitor determines, at decision block 805, if batch e is marked processing in batch file processing status table 401. If batch file e is marked processing, the split monitor proceeds to decision block 825, as described above. If batch file e is marked not processing, the split monitor marks entry e processing in batch file processing status table 404, as indicated at block 807. Then, the split monitor sets a constant N equal to the number of files in split file send table 501 associated with batch file e, and set a constant n equal to 1, as indicated at block 809. The split monitor then determines, at decision block 811, if split file n can be cleared by the end of the business day for its clearing management system location. If split file n cannot be so cleared, the split monitor marks batch file e not processing in status table 401, as indicated at block 813, a processing continues at decision block 825. If split file n can be cleared by the end of the business day, the split monitor determines, at decision block 815, if n is equal to N. If n is not equal to N, the split monitor increments n, at block 817, and returns to decision block 811. The split monitor loops through blocks 811-817 until, as determined at decision block 817 all entries in split file send status table 501 have been tested for whether or not they can be cleared by their respective clearing management systems.

If any split file cannot be cleared by the end of the business day, none of the split files of the batch e will be sent for clearing. If, as determined at decision block 815, all the split files associated with batch e can be cleared by the end of the day, the split monitor sends the split files associated with batch file 3 to their respective clearing management systems, as indicated a block 819. Then, the split monitor marks status tables 301 and 501 to indicate that the files split from entry e have been sent. Then, split monitor processing proceeds to decision block 825. Split monitor processing continues until a entries in send status table 301 have been processed.

Figure 9:
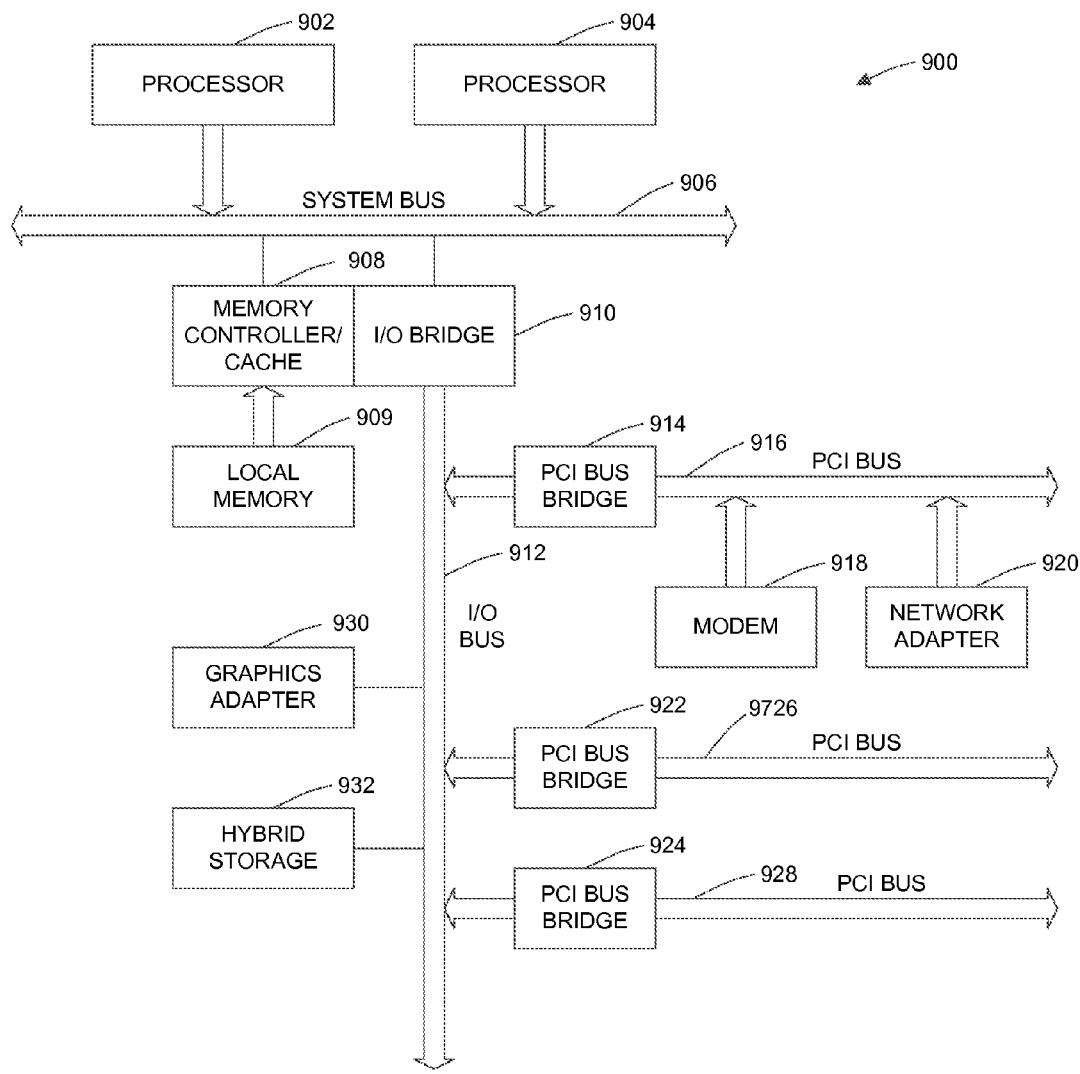
FIG. 9 is a block diagram of a computing device in which embodiments of the present disclosure may be implemented.

FIG. 9 is a block diagram of a data processing system upon which embodiments of the present disclosure may be implemented. Data processing system 900 may be a symmetric multiprocessor (SMP) system including a plurality of processors 902 and 904 connected to system bus 906. Alternatively, a single processor system may be employed. Also connected to system bus 906 is memory controller/cache 908, which provides an interface to local memory 909. I/O bus bridge 910 is connected to system bus 906 and provides an interface to I/O bus 912. Memory controller/cache 908 and I/O bus bridge 910 may be integrated as depicted.

Peripheral component interconnect (PCI) bus bridge 914 connected to I/O bus 912 provides an interface to PCI local bus 916. A number of modems may be connected to PCI local bus 916. Typical PCI bus implementations will support four PCI expansion slots or add-in connectors. Communications links to networks may be provided through a modem 918 or a network adapter 920 connected to PCI local bus 916 through add-in boards. Additional PCI bus bridges 922 and 924 provide interfaces for additional PCI local buses 926 and 928, respectively, from which additional modems or network adapters may be supported. In this manner, data processing system 900 allows connections to multiple network computers. A memory-mapped graphics adapter 930 and hybrid storage 932 may also be connected to I/O bus 912 as depicted, either directly or indirectly.

Those of ordinary skill in the art will appreciate that the hardware depicted in FIG. 9 may vary. For example, other peripheral devices, such as optical disk drives and the like, also may be used in addition to or in place of the hardware depicted. The depicted example is not meant to imply architectural limitations with respect to the present disclosure.

The data processing system depicted in FIG. 9 may be, for example, an IBM® eServer™ pSeries system, a product of International Business Machines Corporation in Armonk, N.Y., running the Advanced Interactive Executive (AIX™) operating system or LINUX operating system.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium or media having computer readable program code embodied thereon.

Any combination of one or more computer readable storage medium or media may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions comprising the program code for carrying out aspects of the present disclosure may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable medium produce an article of manufacture including instructions which implement the function/act specified in the foregoing flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the foregoing flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, processes, operations, elements, and/or components, but do not preclude the presence or addition of one or more other features, integers, processes, operations, elements, components, and/or groups thereof.

The corresponding structures, materials, acts, and equivalents of all elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

From the foregoing, it will be apparent to those skilled in the art that systems and methods according to the present disclosure are well adapted to overcome the shortcomings of the prior art. While the present disclosure has been described with reference to the above embodiments, those skilled in the art, given the benefit of the foregoing description, will recognize alternative embodiments. Accordingly, the foregoing description is intended for purposes of illustration and not of limitation.

What is claimed is:

1. A method of clearing payment card transactions in a payment card transaction processing system, comprising:
receiving a batch of payment card transaction records at a processor of the payment card transaction processing system;
splitting, with the processor, the batch of payment card transactions into one or more split files according to one or more processing agreements, each of the processing agreements comprising a splitting rules table stored in a computer memory of the payment card transaction processing system, the splitting rules table including: a geographic or political boundaries rules column that contains either a geographic boundary rule or a political boundary rule, a currency rules column that contains a currency-based rule, and a clearing management system (CMS) column that lists at least one clearing management system associated with the one or more processing agreements, the splitting further comprising:
  determining that one or more transaction record of the batch is subject to a processing agreement requiring local clearing management specified by either the geographic boundary rule or the political boundary rule;
  placing each transaction record that is subject to the processing agreement requiring local clearing management in a local split file associated with a respective processing agreement requiring local clearing management;
  placing each transaction record that is not subject to any processing agreement requiring local clearing management in a global split file; and,
  determining a clearing location for each transaction record according to the splitting rules table;
determining, for each of the one or more split files, that the split file can be cleared by an associated clearing management system by a close of a same business day; and
distributing to the at least one associated clearing management system, in response to determining that each of the one or more split files can be cleared by the close of the same business day, and via a network, the one or more split files according to the one or more processing agreements based on either the geographic boundary rule, the political boundary rule or the currency-based rule, the distributing further comprising:
  transmitting each local split file to a local clearing management system associated with the processing agreement; and,
  transmitting each global split file to a global clearing management system.

2. The method as claimed in claim 1, wherein the splitting further comprises:
  maintaining each splitting rules table according to a respective associated processing agreement.

3. The method as claimed in claim 2, wherein the splitting further comprises:
  determining the clearing location of each transaction record and writing the transaction record and the clearing location to a temporary file.

4. The method as claimed in claim 3, wherein the splitting further comprises:
  sorting the temporary file into clearing location groups according to the respective clearing location groups determined for the transaction record;
  creating a split file associated with each of the clearing location groups; and,
  writing the transaction records of each of the clearing location groups to the split file associated with each of the clearing location groups.

5. A payment card transaction clearing system, comprising:
  a payment card network;
  a file distribution system in communication with the payment card network, wherein the file distribution system includes:
  a split processor configured to receive a batch of payment card transaction records from the payment card network, and split the batch of payment card transactions into one or more split files according to one or more processing agreements, each of the processing agreements comprising a splitting rules table stored in a computer memory, the splitting rules table including: a geographic or political boundaries rules column that contains either a geographic boundary rule or a political boundary rule, a currency rules column that contains a currency-based rule, and a clearing management system (CMS) column that lists at least one clearing management system associated with the one or more processing agreements, the split processor further configured to:
    determine that one or more transaction record of the batch is subject to a processing agreement requiring local clearing management specified by either the geographic boundary rule or the political boundary rule;
    place each transaction record that is subject to any processing agreement requiring local clearing management in a local split file associated with a respective processing agreement requiring local clearing management;
    place each transaction record that is not subject to any processing agreement requiring local clearing management in a global split file; and,
    determine a clearing location for each transaction record according to the splitting rules table; and
  a split monitor processor configured to determine, for each of the one or more split files, that the split file can be cleared by the associated clearing management system by a close of a same business day, and transmit the one or more split files to the payment card network based on either the geographic boundary rule, the political boundary rule or the currency-based rule in response to determining that each of the one or more split files can be cleared by the close of the same business day, the distributing further comprising:
    transmitting each local split file to a local clearing management system associated with the processing agreement and,
    transmitting each global split file to a global clearing management system.

6. The system as claimed in claim 5, wherein the split processor is further configured to write the transaction record and the clearing location to a temporary file.

7. The system as claimed in claim 6, wherein the split processor is further configured to:
  sort the temporary file into groups according to clearing location;
  create a split file associated with each clearing location group; and,
  write the transaction records of each clearing location group to the split file associated with the clearing location group.

8. A non-transitory computer-readable storage medium encoded with data and instructions, which when executed by a payment card transaction processing system the instructions causing the computing device to:
  receive a batch of payment card transaction records of the payment card transaction processing system;
  split the batch of payment card transactions into one or more split files according to one or more processing agreements, each of the processing agreements comprising a splitting rules table stored in a computer memory of the payment card transaction processing system, the splitting rules table including: a geographic or political boundaries rules column that contains either a geographic boundary rule or a political boundary rule, a currency rules column that contains a currency-based rule, and a clearing management system (CMS) column that lists at least one clearing management system associated with the one or more processing agreements, the splitting further comprising:
determining that one or more transaction record of the batch is subject to a processing agreement requiring local clearing management specified by either the geographic boundary rule or the political boundary rule;
placing each transaction record that is subject to any processing agreement requiring local clearing management in a local split file associated with a respective processing agreement requiring local clearing management;
placing each transaction record that is not subject to any processing agreement requiring local clearing management in a global split file; and,
determining a clearing location for each transaction record according to the splitting rules table;
determine, for each of the one or more split files, that the split file can be cleared by the associated clearing management system by a close of a same business day; and
distribute to the at least one associated clearing management system, the one or more split files according to the one or more processing agreements based on either the geographic boundary rule, the political boundary rule or the currency-based rule in response to determining that each of the one or more split files can be cleared by the close of the same business day, the distributing further comprising:

transmitting each local split file to a local clearing management system associated with the processing agreement; and,
transmitting each global split file to a global clearing management system.

9. The non-transitory computer-readable storage medium of claim 8 wherein the instructions causing the computing device to split the batch further include instructions causing the computing device to:
maintain each splitting rules table according to a respective associated processing agreement.

10. The non-transitory computer-readable storage medium of claim 9 wherein the instructions causing the computing device to split the batch further include instructions causing the computing device to:
determine the clearing location of each transaction record and writing the transaction record and the clearing location to a temporary file.

11. The non-transitory computer-readable storage medium of claim 10 wherein the instructions causing the computing device to split the batch further include instructions causing the computing device to:
sort the temporary file into groups according to clearing location;
create a split file associated with each clearing location group; and,
write the transaction records of each clearing location group to the split file associated with the clearing location group.

* * * * *